United States Patent [19]

Brunnett et al.

[11] Patent Number: 4,910,617
[45] Date of Patent: Mar. 20, 1990

[54] DISK DRIVE HEAD POSITIONING SERVO SYSTEM UTILIZING ENCODED TRACK ZONE INFORMATION

[75] Inventors: Donald Brunnett, Mission Hills; Ashok K. Desai, Westlake Village; Mark A. Heimbaugh, Canyon Country, all of Calif.

[73] Assignee: Brand Technologies, Chatsworth, Calif.

[21] Appl. No.: 188,048

[22] Filed: Apr. 29, 1988

[51] Int. Cl.[4] ............... G11B 5/58; G11B 20/12
[52] U.S. Cl. ................... 360/78.14; 360/77.08; 360/77.11; 360/135; 360/77.05
[58] Field of Search ............ 360/77.02, 77.05, 77.08, 360/77.11, 78.14, 135

[56] References Cited

U.S. PATENT DOCUMENTS

| | | | |
|---|---|---|---|
| 4,195,320 | 3/1980 | Andresen | 360/78.14 |
| 4,297,737 | 10/1981 | Andresen et al. | 360/77.08 |
| 4,424,543 | 1/1984 | Lewis et al. | 360/77.08 |
| 4,539,607 | 9/1985 | Fujiki | 360/77.08 |
| 4,682,253 | 7/1987 | Leslie | 360/78.14 |
| 4,811,135 | 3/1989 | Janz | 360/78.14 |

Primary Examiner—Robert L. Richardson
Assistant Examiner—David L. Robertson
Attorney, Agent, or Firm—Freilich, Hornbaker & Rosen

[57] ABSTRACT

The invention is directed to a head positioning servo system for disk drives employing a dedicated servo surface. A plurality of servo cells are recorded on the servo surface each including a sync field for storing multiple magnetic flux transitions. Each sync field consists of multiple unit areas wherein each of said transitions is selectively stored in one or more of said unit areas. In the preferred embodiment, each sync field includes double frequency (2f) transitions which are stored in a single unit area and single frequency (1f) transitions which are stored in two adjacent unit areas. The two types of transitions are used to encode each sync field to define either a valid ("1") sync or a non-valid ("0") sync. Valid syncs are detected to generate sync pulses for timing control to derive both rotational and radial position information from the servo surface.

8 Claims, 7 Drawing Sheets

DISK DRIVE HEAD POSITIONING SERVO SYSTEM UTILIZING ENCODED TRACK ZONE INFORMATION

BACKGROUND OF THE INVENTION

This invention relates generally to disk drive systems for storing digital data and more particularly to such systems utilizing servo information prerecorded on a dedicated disk surface for controlling tee positioning of read/write heads to read and/or write data on concentric tracks on other disk surfaces.

Typical high capacity disk drive units use a plurality of rigid magnetic disks stacked on a common spindle. For example only, such a unit may consist of five disks defining ten major disk surfaces with one surface being dedicated to storing servo information and the others being used for storing digital data. Such a disk drive unit typically includes a positioner subsystem, mounted adjacent to the disk stack, carrying a plurality of aligned read/write heads including at least one head per active disk surface (i.e. servo plus data surfaces). The heads are typically mounted on a common head arm which is coupled to a positioner motor. Energization of the positioner motor moves the arm to thus move each head radially relative to its disk surface. By properly controlling the positioner motor, the heads can seek, and then follow, any selected one of a plurality of concentric tracks prerecorded on the servo surface.

A disk drive unit is typically comprised of two primary portions; namely, a head disk assembly (HDA) and a controller electronics board. In the normal operation of such a unit, a track seek command is issued by a host computer to the controller electronic. The controller electronics determines the direction and magnitude of movement required to move the heads from their current track (or "cylinder") position to the new or destination track. Based on this information, the controller electronics selects an optimized velocity profile to rapidly move the head arm to position the heads over the destination track.

High performance disk drive unts attempt to maximize the density at which tracks are written. For example, it is not unusual for data tracks to be recorded at a density in excess of one thousand per radial inch. In order to achieve such high track densities and permit rapid head positioning, the positioner motor is usually operated in a closed servo loop. That is, as the positioner motor is energized to move the heads, the servo head (i.e. the head associated with the dedicated servo surface) counts track crossings of a prerecorded servo pattern until the head arrives at its destination track. For example, assume that the heads are currently at data track 19 and that the computer issues a command to move the heads to data track 739. In response, a track counter is set to the magnitude of movement required, i.e. 720, and the positioner motor is moved in accordance with a velocity profile which permits it to accelerate to a maximum velocity, maintain that maximum velocity for a certain interval, and then decelerate to reach zero velocity concurrent with the head arriving at the destination track. The velocity transition points are generally determined by the current count in the track counter which is decremented as the servo head detects track crossings of the servo pattern recorded on the dedicated servo surface.

The foregoing explanation is generally applicable to various state of the art disk drive systems well known in the technical literature and widely commercially available. One such system comprises the 1320 series of disk drive units marketed by Micropolis Corporation of Chatsworth, Calif. Other systems are described in many issued U.S. patents including:

| | | | |
|---|---|---|---|
| 3,593,333 | 3,691,543 | 3,838,457 | 3,893,180 |
| 4,415,939 | 4,556,597 | 4,630,144 | 4,052,741 |
| 4,418,368 | 4,558,383 | 4,631,606 | 4,087,843 |
| 4,424,543 | 4,559,570 | 4,633,343 | 4,101,942 |
| 4,439,800 | 4,562,562 | 4,633,345 | 4,135,217 |
| 4,462,053 | 4,568,988 | 4,633,451 | 4,157,577 |
| 4,488,187 | 4,575,775 | 4,636,885 | 4,163,265 |
| 4,488,188 | 4,575,776 | 4,638,384 | 4,188,646 |
| 4,238,809 | 4,490,756 | 4,589,037 | 4,639,906 |
| 4,286,296 | 4,286,296 | 4,297,737 | 4,511,938 |
| 4,590,526 | 4,642,709 | 4,331,976 | 4,516,162 |
| 4,590,527 | 4,647,992 | 4,352,131 | 4,524,398 |
| 4,602,304 | 4,656,538 | 4,380,033 | 4,530,019 |
| 4,613,915 | 4,669,003 | 4,390,911 | 4,530,020 |
| 4,616,275 | 4,669,003 | 4,390,912 | 4,549,232 |
| 4,616,276 | 4,679,103 | 4,400,747 | 4,412,165 |
| 4,554,600 | 4,628,380 | 4,686,590 | 4,414,589 |

The aforementioned Micropolis 1320 comprises an exemplary hard disk drive unit employing a dedicated surface on which position (or servo) information is recorded during the manufacturing process. In use, this position information is accessed by the servo head and processed by the units servo electronics to control the positioner motor. The recorded position information contains the following three types of information.

(1) Radial Position: The disk surface is partitioned into four major zones (concentric bands) as follows.
  Outer guard band
  Data zone (track O of the data zone is specially coded)
  Inner guard band
  (Landing zone (2) Rotational (circumferential) Position: A once per revolution index position is encoded.

(3) Position Error: Information is encoded to produce a two-phase position error signal (Reference and Quadrature). Each position error phase is a triangular waveform which varies cyclically in amplitude, plus or minus, as a function of the displacement of the servo head from the center of a data cylinder.

In the Micropolis 1320, as described in the Micropolis 1320 Maintenance Manual, Document 101420, Rev. B, October, 1985 the position information on the servo surface is organized into 1680 servo cells per track. Each servo cell contains a sync field and four (A, B, C, D) track centerline information fields. The cell sync field consists of two adjacent areas for respectively storing dipoles S1 and S2 (each dipole comprising a pair of opposite magnetic flux transitions). Dipole S1 is present in all servo cells and defines the cell boundary. Dipole S2 is selectively either present or absent and encodes the cell as a "1" or "0" cell. This cell encoding is used by the servo electronics to derive both rotational position and radial position. More specifically each servo track is divided into 30 pie-shaped sectors each containing 56 servo cells. In sector 0, each eight cell sequence (on all tacks) yields an eight bit word encoded to identify a disk rotational index position. In sectors 1-29, the cells are encoded to yield eight bit words identifying gross radial position in accordance with the following table:

| Radial Position | Radial Position Code |
| --- | --- |
| Guard Band 1 | 0 1 1 1 1 1 1 0 |
| Guard Band 2 | 0 1 1 1 1 1 1 1 |
| Track 0 | 1 1 1 1 1 1 1 0 |
| Data Zone | 1 1 1 1 1 1 1 1 |

The track centerline information fields in each cell comprise areas in which A, B, C, D dipoles are either present or absent. These track centerline dipoles are arrange relative to the servo track boundaries to yield position error information enabling the servo head to follow a servo track centerline or boundary. The groups of A, B, C, D dipoles are offset with respect to servo track boundaries such that when the servo head is aligned with a track, it will read either a full or half or zero amplitude output for each dipole group in accordance with the following table:

| Track Boundary | A | B | C | D | (A − B) | (C − D) |
| --- | --- | --- | --- | --- | --- | --- |
| w | 0.0 | 1.0 | 0.5 | 0.5 | −1.0 | 0.0 |
| x | 0.5 | 0.5 | 0.0 | 1.0 | 0.0 | −1.0 |
| y | 1.0 | 0.0 | 0.5 | 0.5 | +1.0 | 0.0 |
| z | 0.5 | 0.5 | 1.0 | 0.0 | 0.0 | +1.0 |
| w | 0.0 | 1.0 | 0.5 | 0.5 | −1.0 | 0.0 |

The foregoing is accomplished by an organization in which each servo cell, dependent on its position, includes in its four track centerline information fields either (1) an A and C or D dipole or (2) a B and C or D dipole.

SUMMARY OF THE INVENTION

The present invention is directed to an improved head positioning servo system for disk drives employing a dedicated servo surface. In particular, the invention is directed to a servo system exhibiting a high degree of immunity to media defects and/or shifts in cell sync timing.

In accordance with one aspect of the invention, each servo cell on the disk servo surface includes a sync field for storing multiple (at least five) magnetic flux transitions. In a preferred embodiment, the peaks in the servo head output signal are precisely located by first differentiating the signal and then applying it to a zero crossing detector.

In accordance with a further aspect of the invention, each sync field consists o multiple unit areas and wherein each of said transitions is selectively stored in one or more said unit areas. Thus, each transition produces an output signal perturbation having a frequency inversely related to the number of unit areas used to store the transition. In the preferred embodiment, each sync field includes double frequency (2f) transitions which are stored in a single unit area and single frequency (1f) transitions which are stored in two adjacent unit areas.

In accordance with a still further aspect of the invention, each sync field is encoded to define either a valid ("1") sync or a nonvalid ("0") sync. In the preferred embodiment, the sync field is encoded by the sequence of 1f and 2f transitions used. For example, in the preferred embodiment, all valid sync fields are represented by the transition sequence 2f, 2f, 2f, 1f, 1f, 1f, 2f, 2f, 2f, and nonvalid sync fields by the sequence 2f, 2f, 2f, 2f, 2f, 2f, 1f, 2f, 2f, 2f. Both the valid and nonvalid sync fields occupy the same number of unit areas on the disk, e.g. twelve.

In accordance with a still further aspect of the invention, each servo cell includes at least first and second centerline information fields recorded end-to-end along a track following the sync field. A burst of several (at least five) transitions is recorded in each centerline information field a central portion of that burst is sampled to derive centerline information.

In accordance with a still further aspect of the invention, a digital sync field decoder is provided for generating a precisely timed sync pulse only in response to a valid sync field. The valid and nonvalid sync field sequences are particularly selected to avoid the creation of an interference pattern which could generate a spurious sync pulse at the wrong time.

In accordance with a still further aspect of the invention, the sync pulse is used to reset a cyclic timing counter, which is continually clocked by an oscillator. The output of the timing counter is used (1) to gate a sequence of valid and/or nonvalid syncs into a register to identify the zone being read and (2) to define the window during which each centerline information field is sampled.

DETAILED DESCRIPTION

Figure 1:
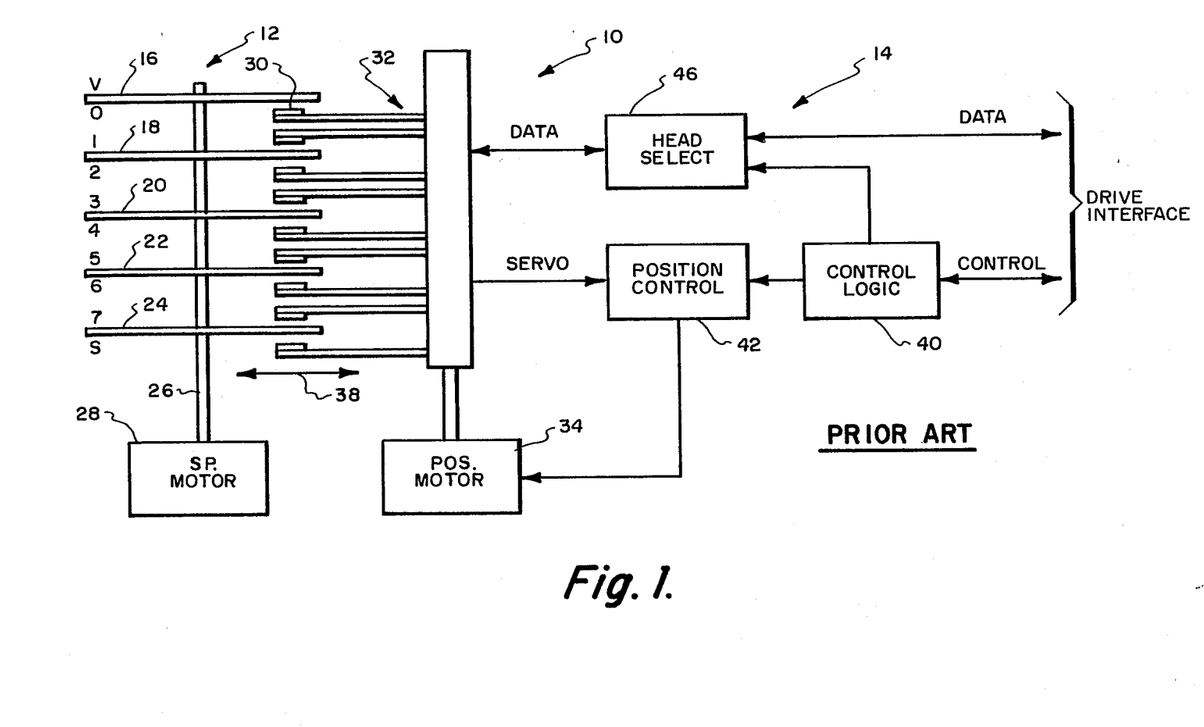
FIG. 1 is a block schematic diagram of a typical prior art rigid disk storage system.

Attention is initially directed to FIG. 1 which depicts a generalised block diagram of typical prior art rigid magnetic disk drive unit 10. The unit 10 is generally considered as being comprised of essentially two portions; namely a head disk assembly (HDA) 12 and a circuit board of controller electronics 14.

Briefly, the HDA 12 is comprised of a plurality of rigid disks 16, 18, 20, 22, 24, which are mounted on a common spindle 26 coupled to the shaft of a spindle motor 28. Each of the disks defines two major surfaces having magnetic properties for magnetically storing digital information thereon. The operative major disk surfaces in FIG. 1 are labeled S and 0, 1, 2, 3, 4, 5, 6, and 7 respectively. The surface S represents a surface dedicated to the storage of servo information used for head positioning purposes as will be discussed hereinafter. The disk surfaces 0-7 are used for storing digital data. The surface V is typically vacant and unused in normal operation. Although FIG. 1 depicts a single dedicated servo information surface S, in fact the servo information could be distributed on one or more disk surfaces.

Associated with each disk surface is a read/write head 30. The heads 30 are typically mounted on a common head arm structure 32 which is coupled to the shaft of a positioner motor 34. The positioner motor 34 can be of several different types, e.g. a voice coil motor or a multiple phase DC motor. In any event, the purpose of the positioner motor 34 is to selectively move the head arm structure 32 to move the heads radially over the disk surfaces. Information is typically recorded on the disk surfaces along radially spaced substantially contiguous concentric tracks. Thus, by moving the heads 30 radially relative to the disk surfaces, as represented by arrow 38, the heads can be moved into a position to read and/or write along any selected one of the concentric tracks. Inasmuch as all of the heads 30 move together in a typical disk storage system, their position at any point in time is generally referred to by the track or cylinder number over which the heads lie. Thus, for example, the heads could currently be positioned over data track 19 (assuming the outermost track to be track 0) and a positioning command can be then issued (by a host computer, not shown) to move the heads to track 739. This would require that the heads then move radially inwardly a distance corresponding to 720 data tracks.

The controller electronics 14 depicted in FIG. 1 is intended to interface the head drive assembly 12 to a host computer (not shown). The positioning command issued by the host computer is supplied to control logic 40 which, typically, sets a track counter (not shown) in the position control electronics 42 to a count equal to the desired head movement. Thus, in the aforementioned example, the track counter would be set to 720 and the position motor 34 would be energized to move the heads in the appropriate direction. Depending upon the count set into the track counter, a certain velocity profile is selected which permits the heads to accelerate to a maximum velocity, maintain that maximum velocity for a certain interval, and then decelerate to reach zero velocity concurrent with the heads arriving at the destination track. The velocity transition points are generally determined by the current count in the track counter which is decremented as the head 30 associated with the servo surface S detects track and centerline crossings.

Various servo information patterns are known in the prior art, generally characterized by information alternately recorded inboard and outboard of a track centerline. As the heads are moved radially relative to the disk surfaces, the signal read by the head associated with the servo surface will define transitions indicating track crossings. These transitions are typically used to decrement the track counter during a track seeking operation. The information alternately recorded inboard and outboard of a track centerline is then used for track following to maintain the head position over the desired track centerline. With the heads positioned over the desired track, the control logic 40 can select a particular head, via head select logic 46, to read and/or write data which is transferred to or from the host computer.

The foregoing simplified explanation of the prior art disk storage system of FIG. 1 is intended to acquaint the reader with the operation of such a system and the use of prerecorded servo information for facilitating a positioning of the heads.

Figure 2:
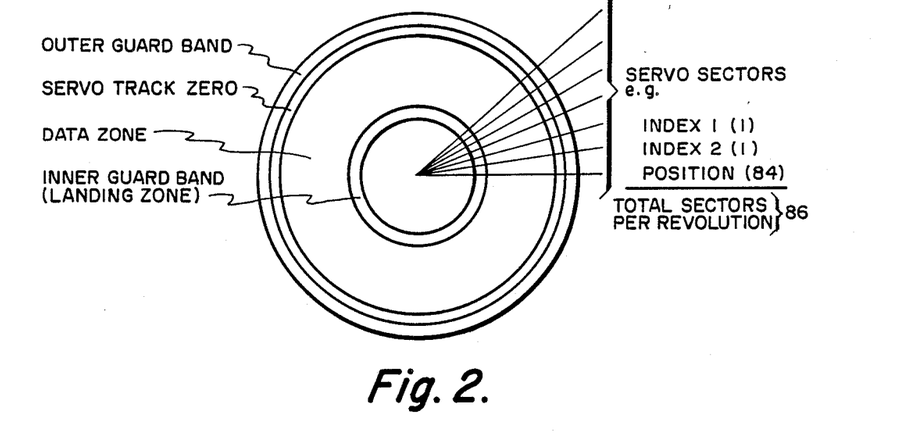
FIG. 2 is a schematic view of a disk servo surface showing the organization of servo information in accordance with a preferred embodiment of the invention.

Attention is now directed to FIG. 2 which schematically illustrates the organization of servo information on a disk servo surface in accordance with the present invention. Initially, note that four concentric annular areas are depicted respectively identified as an outer guard band, servo track zero, data zone, and an inner guard band. Within each of these four annular areas or zones, tracks of servo cells (to be discussed in detail in conjunction with FIGS. 4A and 5A) are typically recorded at the factory when the disk drive unit is manufactured. In addition to the aforementioned annular zones, the servo surface, as depicted in FIG. 2, is organized into multiple pie-shaped sectors, e.g. 86 sectors per revolution. In accordance with a preferred embodiment of the invention, two of the sectors are dedicated as index sectors and the remaining sectors (e.g. 84 sectors) are available for containing radial position information. As will be discussed hereinafter, zone identification information is recorded in each of the index sectors so that when read, it provides an indication of the rotational or circumferential position of the disk relative to the servo head.

Figure 3:
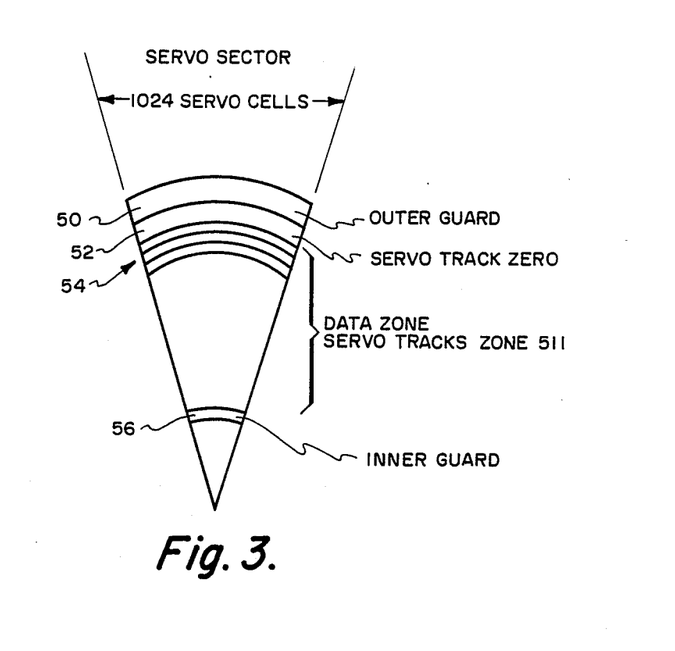
FIG. 3 is a schematic view showing how servo information is organized on a typical sector of the servo surface of FIG. 2.

FIG. 3 depicts a preferred organization of a position servo sector showing the four radially spaced zones. Note that the sector includes an arcuate area 50 comprising a portion of the outer guard band, an arcuate area 52 comprising a portion of servo track zero, arcuate area 54 comprising a portion of the data zone, and arcuate area 26 comprising a portion of the inner guard band. For exemplary purposes, it will be assumed that the data zone contains 511 servo tracks. Parenthetically, it is pointed out that the width of each servo track is typically twice that of the data tracks on other disk surfaces. Thus, with 512 servo tracks (including track zero), 1024 data tracks can be provided on each data surface.

Whereas the outer guard band, servo track zero, data zone and inner guard band each contain servo cell information which identifies the radial zone, the two index sectors preferably contain servo cell information on all tracks which identify the sector as an index sector.

All servo sectors, both index sectors and position sectors, include twenty four servo cells organized end-to-end along each track. It will be appreciated of course that inasmuch as annular area 50 has a longer physical length than annular area 56, each of the servo cells in area 50 will of course have a longer physical length than each of the cells in area 56. However, although their physical lengths differ, their time lengths, i.e. the time duration required to pass a given point (or head) will be the same regardless of the radial distance of the servo cell to the rotational axis of the disk surface.

Figure 4A:
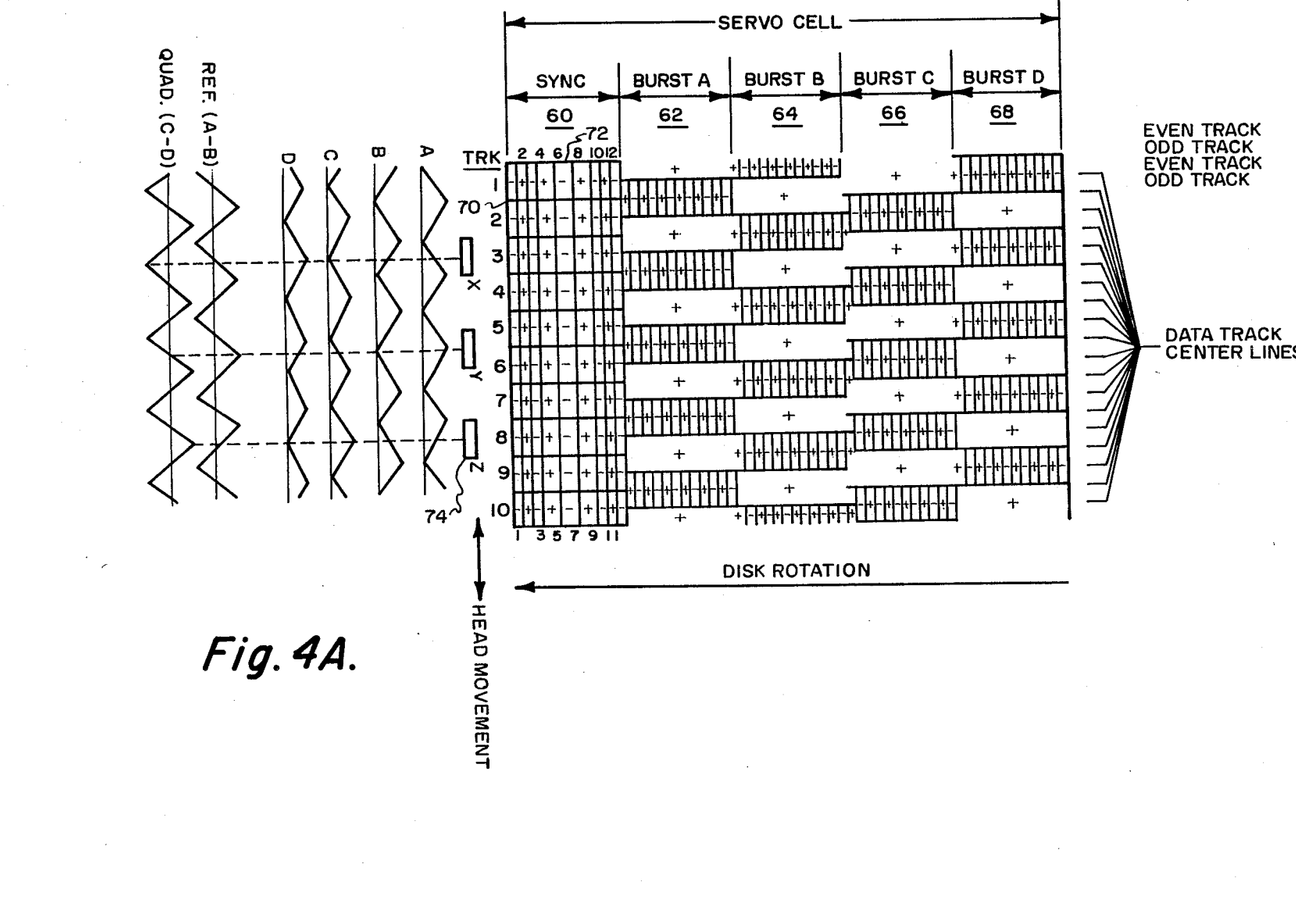
FIG. 4A is a schematic vie showing the organization of servo cells in accordance with a preferred embodiment of the invention.

Attention is now directed to FIG. 4A which depicts a preferred servo cell organization in accordance with the present invention. Specifically, FIG. 4A depicts a portion of the servo surface showing a single servo cell on each of ten adjacent servo tracks. Each servo cell is comprised of a sync field 60, and for track centerline information fields identified as 62 (BURST A), 64 (BURST B), 66 (BURST C), 68 (BURST D). Note that the sync field 60 is physically defined between radially spaced inner and outer boundary lines 70 and 72 respectively The width of the sync field between boundary lines 70 and 72 is substantially the same as that of the servo head 74 (shown in FIG. 4A at arbitrary positions x, y, z).

The sync field is comprised of multiple unit areas, depicted in FIG. 4A as comprising twelve unit areas. A magnetic flux reversal, i.e. transition, is capable of being recorded in each unit area. For clarity of illustration, oppositely oriented flux reversals are respectively depicted in FIG. 4A by the symbols + and −. It will be noted in FIG. 4A that some transitions within the sync field 60 take place over a single unit area, e.g. unit areas 1, 2, 3, 10, 11 and 12, while others occupy two unit areas, e.g. 4 and 5; 6 and 7; and 8 and 9. This variation in transition density is used to encode the sync field as will be discussed further in connection with FIGS. 5A, 5B and 6.

Each of the four track centerline information fields 62, 64, 66 and 68 are also depicted as having multiple, e.g. twelve, unit areas extending along the servo track defined by the circumferential boundary lines 70 and 72. Track centerline information is recorded in each of the fields as shown in FIG. 4A. Thus, in the depicted servo track 1, track centerline information in field 62 is located radially inward of the track centerline (i.e. midway between boundary line 70, 72). This information comprises alternating transitions each occuring over a single unit area.

Whereas all of the transitions in field 62 are located radially inward of the track centerline, the burst B centerline information in field 64 is located radially outward of the track centerline. Field 66 in servo track 1 contains no burst C information. Field 68 of servo track 1 contains burst D whose alternating transitions extend the full width of the track.

Figure 4B:
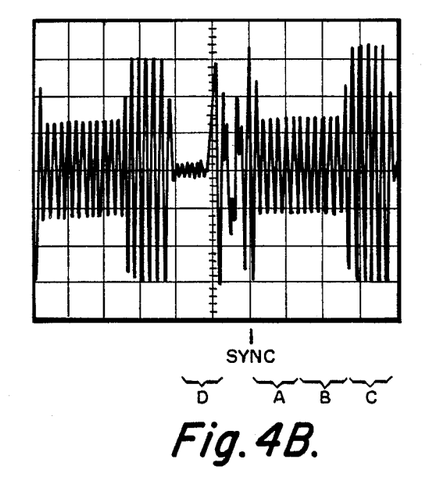
FIG. 4B shows a CRT trace of a typical waveform output by the servo head in response to reading a typical servo cell.

From the foregoing description of servo track 1, it should be apparent that a head 74 aligned with the centerline of servo track 1 will initially read the transitions of sync field 60, and then will see burst A at half amplitude, burst B at half amplitude, burst C at zero amplitude and burst D at full amplitude. As should be apparent from FIG. 4A, a head 74 aligned with servo track 2 will see burst A at half amplitude, burst B at half amplitude, Burst C at full amplitude and burst D at zero amplitude. FIG. 4B shows the output of the servo head 74 when located adjacent to servo track 3. The plots A, B, C and D shown to the left of the servo cell in FIG. 4A depict the amplitude for each burst which would be derived from the servo head 74 output for various head locations, e.g., exemplary head locations x, y and z. The amplitude of the burst read from the four track centerline information fields, is used to develop a reference signal (a−b) and a quadrature signal (c−d) represented in FIG. 4A. Thus for example when head 74 is aligned with servo track 3, the reference signal will be at zero and the quadrature signal will be at a maximum negative value. As a further example, when the head is at position y, substantially bridging the boundary line between tracks 5 and 6, the reference signal will be at a positive maximum and the quadrature signal will be zero. The position motor 34 aligns the heads with even data tracks when the reference signal is zero and odd data tracks when the quadrature signal is zero.

The use of track centerline information fields radially offset with respect to servo track centerlines as shown in FIG. 4A for deriving reference and quadrature signals to enable the servo head to follow a track is well known in the art and is discussed in the aforcited literature. The present invention is particularly directed to the scheme used to encode the sync fields and to more reliably derive the track centerline information from the fields 62, 64, 66 and 68 so as to be more immune to media defects and/or shifts in cell sync timing.

Figure 5A:
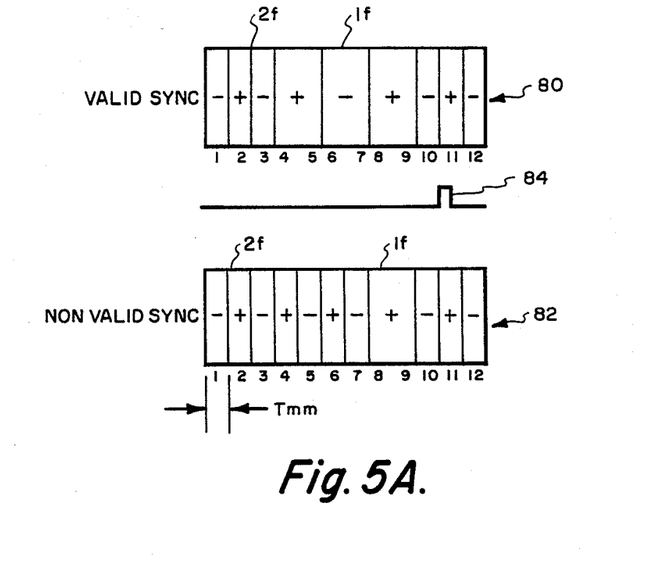
FIG. 5A schematically depicts a valid and nonvalid sync field.

In accordance with the present invention each sync field 60 has prerecorded therein either a valid sync pattern as shown at 80 or a nonvalid sync pattern as shown at 82 in FIG. 5A. Of course, regardless of the particular sync pattern recorded in a sync field, it is comprised of the same number of unit areas, assumed to be twelve. A transition recorded in a single unit area will produce a double frequency (2f) perturbation in the servo head output signal. In contrast, a transition which occupies two unit areas will produce a perturbation having essentially half the frequency, i.e. 1f. It is to be noted in FIG. 5A that a valid sync pattern is characterized by the transition sequence 2f, 2f, 2f, 1f, 1f, 1f, 2f, 2f, 2f. As will be discussed hereinafter in connection with FIG. 5B, a sync field decoder 100 responds to the detection of the subsequence 2f, 1f, 1f, 1f, 2f, to produce a raw sync pulse 64 occurring at the trailing edge of the tenth unit area of the sync field.

In order to avoid creating spurious sync pulses attributable to an interference pattern between adjacent valid and nonvalid sync fields, a particular sequence has been chosen for the nonvalid sync field 82 comprising 2f, 2f, -2f, 2f, 2f, 2f, 2f, 1f, 2f, 2f, 2f. That is, the interference pattern has been selected so that if it results in the generation of a sync pulse, it will occur at the correct time, i.e., at the trailing edge of the tenth unit area of the sync field.

Figure 5B:
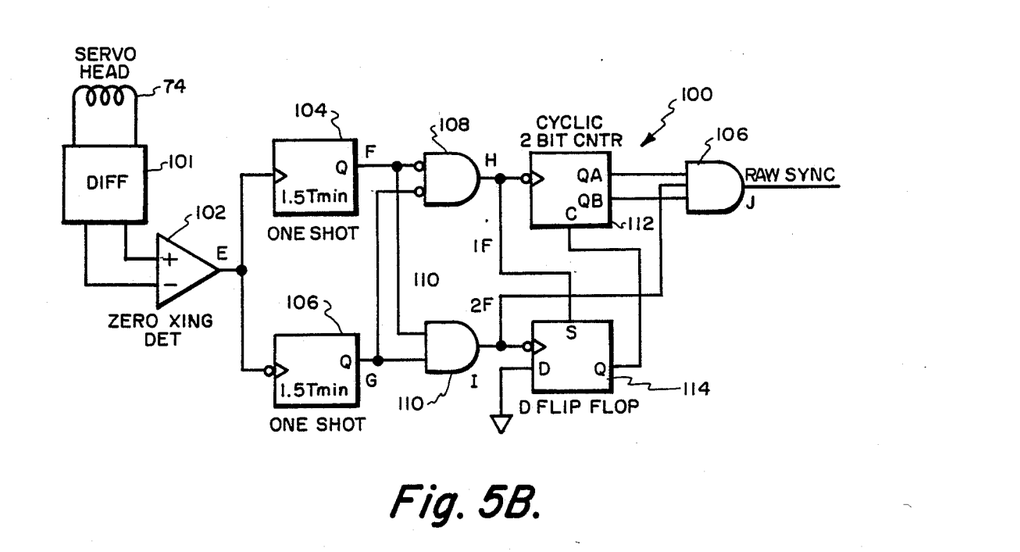
FIG. 5B illustrates a preferred embodiment of a digital sync field decoder.
Figure 6:
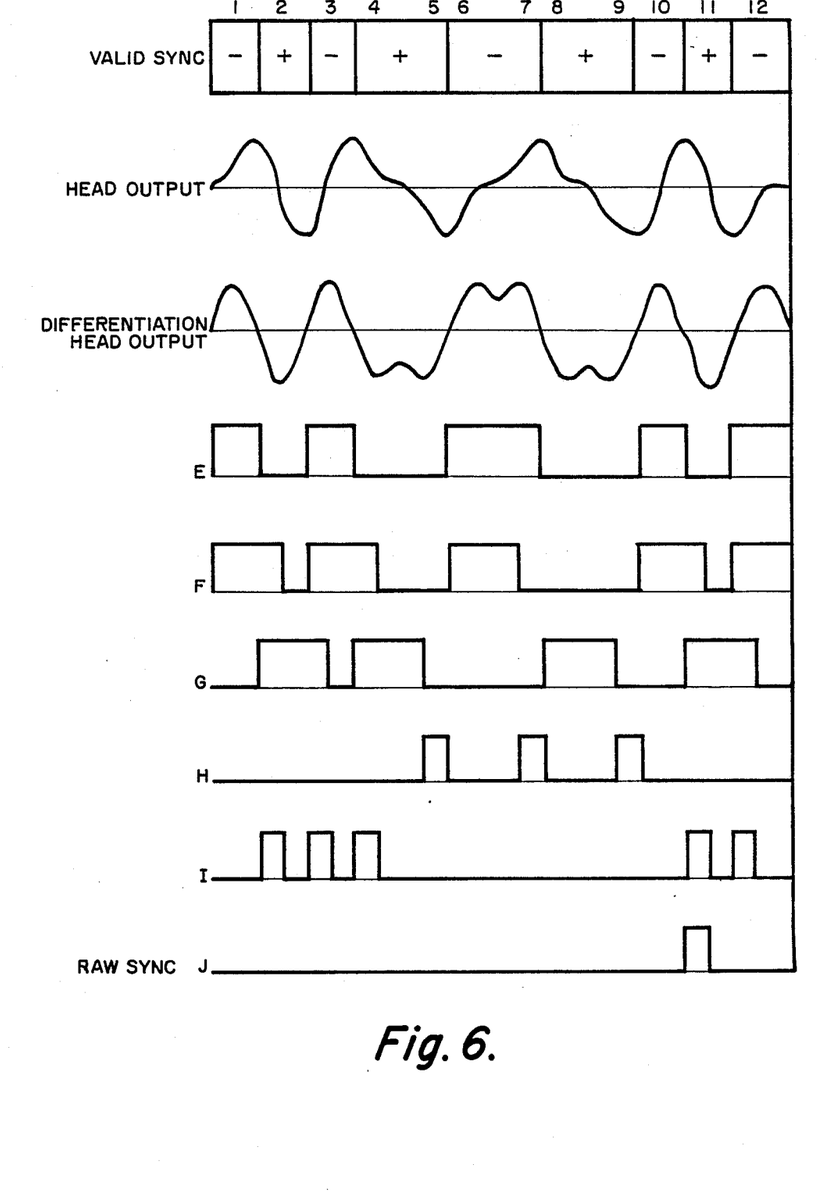
FIG. 6 is a timing diagram illustrating the operation of the decoder of FIG. 5B.

Attention is now directed to FIG. 5B which illustrates a sync field decoder circuit 100 for responding to a valid sync field to output the sync pulse 84 properly placed in time. FIG. 6 depicts a series of wave forms occurring at different points in the decoder circuit 100 to facilitate an understanding of the decoder operation.

The decoder circuit 100 is comprised of a differentiator circuit 101 coupled to the output of servo head 74. The output of circuit 101 is applied to the input of zero crossing detector 102. The output of the zero crossing detector (point E) is applied to first and second one shot circuits 104 and 106. Each one shot defines an unstable time interval equal to 1.5 Tmin, i.e. one and one half times the duration of a unit area of the sync field. The outputs of one shot circuits 104 and 106 are respectively identified as points F nd G. Points F and G are connected to the input of NOR gate 108 and also to the input of AND gate 110. As will be discussed in more detail in connection with the wave forms of FIG. 6, gates 108 and 110 respectively provide output pulses indicative of the detection of 1f and 2f transitions. The output of NOR gate 108 is connected to the input of a two bit counter 112 which cyclically counts 0, 1, 2, 3. Counter output lines QA and QB are both true when the counter defines a count of 3. The clear input of counter 112 is connected to the output of flip flop 114. The input to flip flop 114 is derived from gate 110. Thus, whenever a 2f transition occurs, it will set flip flop 114 to clear the counter 112. Flip flop 114 is then chased by the next 1f pulse from gate 108. If a 2f transition occurs after the counter 112 has reached count 3, then the trailing edge of the 2f transition will enable AND gate 116 to produce the raw sync pulse 64 at point J.

To better understand the operation of the decoder 100, attention is called to FIG. 6 which depicts line the valid sync pattern 80. The second line down on FIG. 6 depicts the output of the servo head 74 responsive to valid sync pattern. The third line down in FIG. 6 depicts the output of differentiation circuit 101. Note that the zero-crossings of the differentiated head output are aligned in time with the peaks of the servo head output. The differentiated head output is applied to the input of the zero crossing detector 102 to produce the wave form shown at line e of FIG. 6. Note that each zero crossing of the differentiated head output changes the state of the wave form at point E. The positive going transitions of waveform E switch one shot 104 to its unstable state. The negative going transitions of waveform E switch one shot 106 to its unstable state to thus produce the waveforms F and G depicted in FIG. 6. Wave forms H and I respectively depict the outputs of NOR gate 108 and AND gate 110 and it will be noted that they respectively represent 1f and 2f transition occurring after three successive 1f transitions, occurring after a 2f transition, enables AND gate 116 to output raw sync pulse 84 (waveform J). It will be noted that the raw sync pulse is generated at the trailing edge of the tenth unit area of the sync cell.

Thus, from the foregoing, it should be appreciated that the decoder of FIG. 5B will generate a raw sync pulse 84 only when it detects a subsequence 2f, 1f, 1f, 1f, 2f. It is important to note that no other sequence of transitions will generate the raw sync pulse. Although various nonvalid sync patters could be employed which, of course, would be ineffective to generate the raw sync pulse, the particular nonvalid sync pattern 82 depicted in FIG. 5A was selected because any interference patterns generated as a consequence of the head essentially straddling the boundary between adjacent valid and nonvalid sync fields would, in the worst case, produce a raw sync pulse 64 properly placed in time, i.e. at the trailing edge of the tenth unit area of the sync filed.

Figure 7:
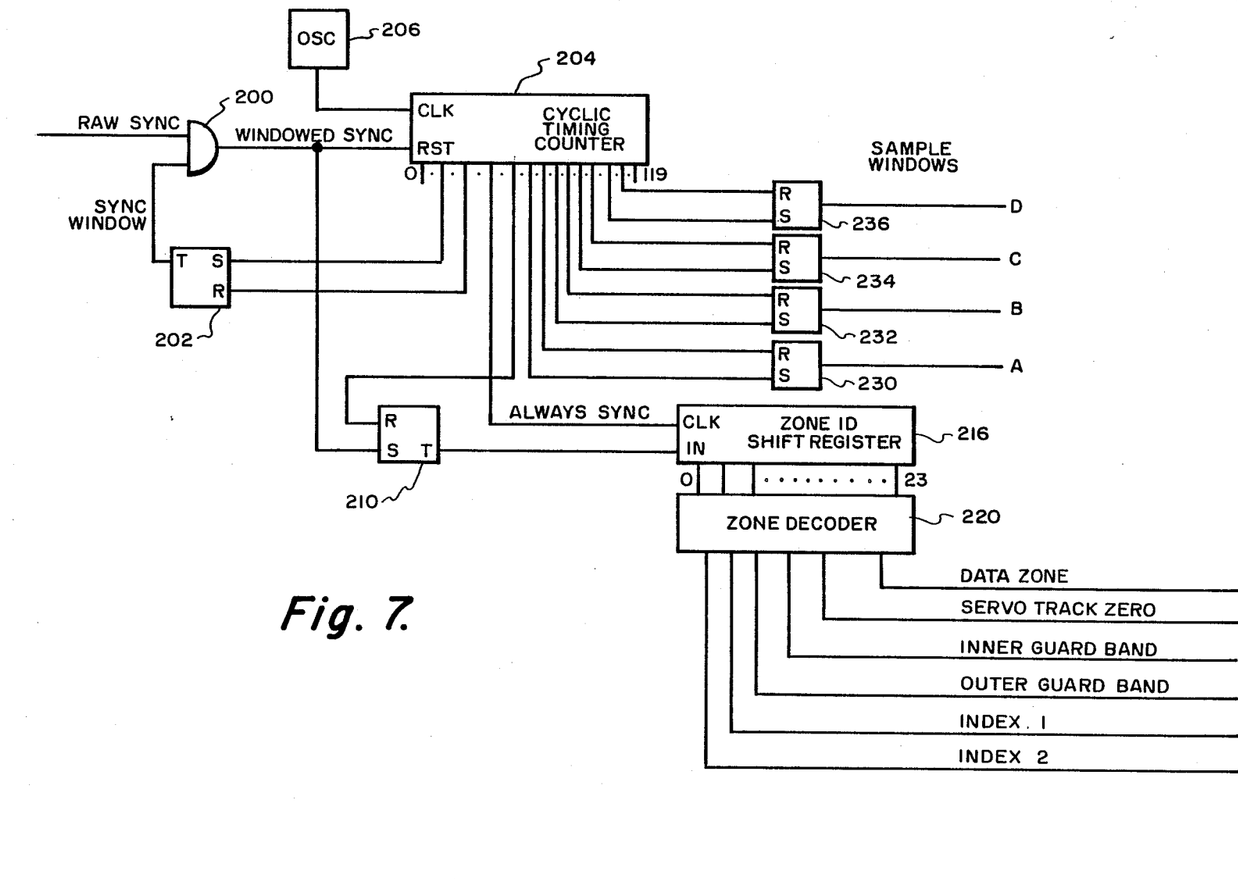
FIG. 7 is a block schematic diagram depicting the digital control electronics in accordance with the present invention for developing radial and rotational zone information.

Attention is now directed to FIG. 7 which illustrates a block schematic diagram for responding to the raw sync pulse 84 to decode the aforementioned major zones (servo track zero, inner guard band, outer guard band, index 1, index 2) and for defining time windows during which the respective track centerline bursts A, B, C, D are sampled.

Before explaining FIG. 1 in detail, it should be understood that the twenty four sync fields along each track of each servo sector are encoded to identify a zone. The following table shows the 24 bit words which uniquely identify each of the zones:

| Zone = Data | Zone Info = 111111111111111111111111 |
| Zone = TrkO | Zone Info = 011111101101101111101111 |
| Zone = Innr | Zone Info = 011111101111011101110111 |
| Zone = Outr | Zone Info = 011111101111101101101111 |
| Zone = Idx1 | Zone Info = 011111101110111110111011 |
| Zone = Idx2 | Zone Info = 011111101110111101111101 |

It is pointed out that the foregoing zone identification codes have been selected so as to be relatively immune to missing (i.e. "0") syncs which could occur, For example, because of media defects.

Returning now to FIG. 7, the raw sync pulse 84 is applied to the input of an AND gate 200. A second input to AND gate 200 comprises a sync window signal derived from the true output of flip flop 202. AND gate 200 thus produces a windowed sync output which is applied to the reset input terminal of a cyclic timing counter 204 to reset the counter to some predetermined initial count. The output of the oscillator 206 drives the counter 204 via a clock input terminal. In the exemplary system disclosed, the counter 204 is capable of defining one hundred twenty states (0, 1, ... 119). Although not necessary, it is preferable, at least conceptually, for the counter 204 to define a number of counts equal to some multiple of the number of unit areas within a servo cell. Accordingly, inasmuch as the assumed servo cell (FIG. 4A) is comprised of sixty unit areas, for convenience, it has been assumed that the counter 204 will define one hundred twenty counts.

Because the timing counter 204 is cyclic, the system can well tolerate an occasional missing sync pulse. However, it is important that the timing counter 204 not respond to any spurious pulse that might be provided by gate 116 outside of a narrow window centered around the expected occurrance of a sync pulse, i.e. the trailing edge of the tenth unit area of a servo cell. Flip flop 202 is provided to define this narrow sync window and is respectively set and reset by two closely spaced counts of counter 204. Thus, it is the windowed sync output from gate 200 which always clears counter 204.

The windowed sync pulse is also applied to the set input terminal of flip flop 210. In other words, if the servo head reads a servo cell containing a valid sync, flip flop 210 will be set during that servo cell interval. If the servo cell contains a nonvalid sync, then the flip flop 210 will not be set. A given count of counter 204 produces an ALWAYS sync pulse which clocks the output of gate 210 into a twenty four bit zone identification shift register 216. The flip flop 210 is reset by a later count of the timing counter 204. Thus, valid ("1") and-/or nonvalid ("0") bits are successivly loaded into the shift register 216 as each servo field is read by the servo head. A zone decoder 220 continually monitors the twenty four bit word in the shift register 216, looking for any of the six unique twenty four bit zone identification codes shown in the aforementioned table. The decoder 220 is depicted in FIG. 7 as having six distinct outputs, each of which respectively goes true when the zone decoder recognizes the corresponding twenty four bit identification code in shift register 216.

It has previously been mentioned in connection with FIG. 4A that each of the track centerline information fields includes multiple (e.g. 12) unit areas. Each field thus can contain a burst of twelve transitions. A typical output from the servo head is shown in FIG. 4B. The waveform of FIG. 4B shows half amplitude A and B bursts, a full amplitude C burst, and a zero amplitude D burst and thus depicts the output of the servo head 74 when aligned with track 2 of FIG. 4A. In accordance with the invention, only a central portion of each burst is sampled to develop the reference and quadrature signals. This will be discussed further in connection with FIG. 8 but, it is pointed out with reference to FIG. 7 that flip flops 230, 232, 234 and 236 are provided for respectively defining time windows during which each of the A, B, C and D bursts will be sampled. In the preferred embodiment it is intended to sample the servo head output only during a central portion of each burst interval containing multiple perturbations (e.g. corresponding to transition unit areas 4 through 9).

Figure 8:
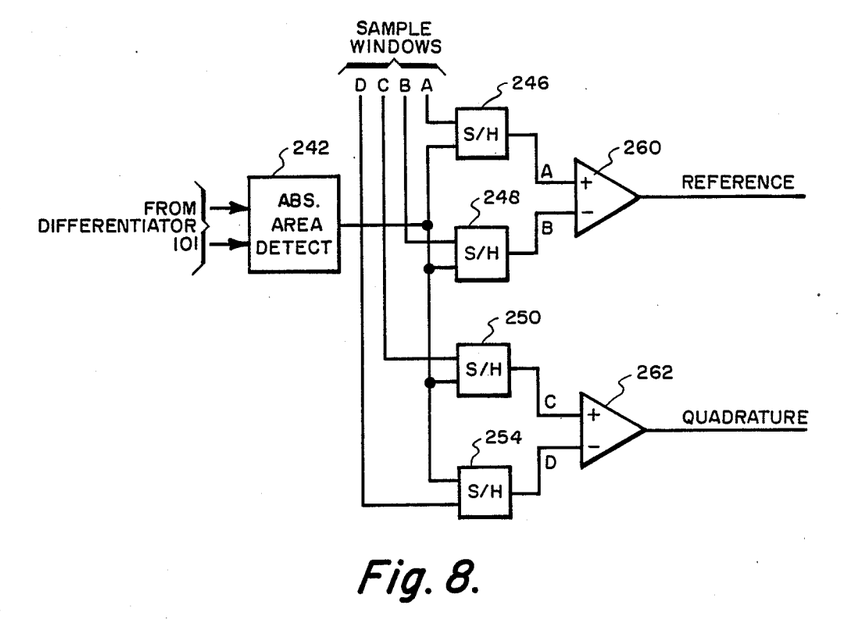
FIG. 8 is block schematic diagram depicting the digital control electronics for processing track centerline information.

Attention is now directed to FIG. 8 which shows an absolute area detector circuit 242. Basically, the detector circuit 242 is a full wave rectifier which receives the output from differentiator circuit 101 and determines the area under the curve. More specifically, during a burst interval, the servo head 74 will essentially output a sinc wave signal. This signal is differentiated and then full wave rectified in the detector 242. The area under the rectified curve indicates the signal level read by the servo head. Thus, if the servo head is nominally aligned with servo track 2 of FIG. 4A, but oriented slightly more toward track 1 than track 3, a greater level of burst A will be read than burst B. That is, the area under the curve associated with burst A will be greater than that associated with burst B. The output of the detector 242 is gated into sample and hold circuits 246, 248, 250 and 254 by the sample windows depicted in FIG. 7. Differential amplifier 260 then produces the reference signal A-B previously referred to in connection with FIG. 4A. Differential amplifier 262 produces the quadrature signal C-D. The use of area detection over several signal perturbations enhances the drive unit's signal-to-noise ratio.

From the foregoing, it should now be appreciated that an improved disk drive unit servo system has been disclosed herein. The servo system in accordance with the invention is characterized by the use of a servo pattern containing sync fields in which valid and nonvalid syncs are encoded by use of single frequency and dual frequency transitions. The sync fields are used to produce a sync pulse for driving a cyclic counter which digitally controls a zone identification procedure and provides the timing for efficiently sampling intermediate portions of bursts of track centerline information recorded in fields of each servo cell immediately following the sync field.

We claim:

1. In a disk drive unit including a plurality of disks mounted for rotation about a common axis and a plurality of heads mounted for radial movement over the surfaces of said disks, a positioner system for controlling the positioning of said heads, said positioning system including:
 a servo pattern recorded on one of said disk surfaces, said servo pattern comprised of a plurality of concentric tracks and including a series of servo cells recorded end-to-end and including a series of servo cells recorded end-to-end along each of said tracks;
 each of said servo cells comprising a sync field and at least first and second centerline information fields recorded end-to-end along said tracks;
 a burst of at leas five transitions recorded in each of said sync fields selectively comprising either valid sync data or nonvalid sync data;
 a burst of at least five transitions recorded in said first centerline information field radially outward of the centerline extending through said sync field;
 a burst of at least five transitions recorded in said second centerline information field radially inward of the centerline extending through said sync field;
 said plurality of heads including a servo head responsive to said transitions on said one disk surface for producing an output signal;
 decoder means responsive to said output signal for generating a sync pulse in response to a sync field containing valid sync data, said decoder means including means for differentiating said output signal and means for determining zero crossings of said differentiated output signal to precisely locate in time the peaks of said output signal;
 said plurality of concentric tracks being organized into at least first, second and third track zones, each of said track zones being populated by sync fields containing valid and/or nonvalid sync data arranged in a sequence to uniquely encode that track zone.

2. The disk drive unit of claim 1 further including a cyclic timing counter;
 oscillator means for causing said timing counter to count at a fixed rate; and
 means for resetting said timing counter in response to said sync pulse.

3. The disk drive unit of claim 2 further including means responsive to said decoder means and said timing counter for identifying the position of said servo head with respect to said track zones.

4. The disk drive unit of claim 1 further including a cyclic timing counter;
 oscillator means for causing said timing counter to count at a fixed rate; and
 means for resetting said timing counter in response to said sync pulse.

5. The disk drive unit of claim 4 including detector means responsive to said servo head output signal for determining the amplitude of each burst read from said first and second centerline information fields; and wherein
 said detector means includes sampling means for sampling multiple transitions substantially centrally located in each centerline information field burst.

6. The disk drive unit of claim 5 wherein said detector means includes an absolute area detector.

7. The disk drive unit of claim 6 wherein said sampling means is responsive to said timing counter.

8. The disk drive unit of claim 1 wherein said sync pulse responsive to valid sync data is generated at a specific time relative to said servo head reading said sync field; and wherein
 said valid and nonvalid sync data fields are selected so that any sync pulse generated as a consequence of interference between said fields also occurs at said specific time.

* * * * *